(12) United States Patent
Choquette et al.

(10) Patent No.: US 9,606,808 B2
(45) Date of Patent: Mar. 28, 2017

(54) METHOD AND SYSTEM FOR RESOLVING THREAD DIVERGENCES

(75) Inventors: Jack Choquette, Palo Alto, CA (US); Xiaogang Qiu, San Jose, CA (US); Jeff Tuckey, Los Gatos, CA (US); Michael (Ming Yiu) Siu, Santa Clara, CA (US); Robert J. Stoll, Los Altos, CA (US); Olivier Giroux, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 635 days.

(21) Appl. No.: 13/348,544

(22) Filed: Jan. 11, 2012

(65) Prior Publication Data

US 2013/0179662 A1    Jul. 11, 2013

(51) Int. Cl.
*G06F 9/38*    (2006.01)

(52) U.S. Cl.
CPC .......... *G06F 9/3887* (2013.01); *G06F 9/3851* (2013.01)

(58) Field of Classification Search
CPC .... G06F 9/3851; G06F 9/3887; G06F 9/3889; G06F 15/8007; G06F 9/3885

USPC ................. 712/E9.053, E9.071, 21, 22, 215
See application file for complete search history.

(56) References Cited

U.S. PATENT DOCUMENTS

| 7,477,255 | B1 * | 1/2009 | Lindholm et al. ............ 345/501 |
| 7,634,637 | B1 | 12/2009 | Lindholm et al. |
| 7,834,881 | B2 * | 11/2010 | Liu et al. ...................... 345/557 |
| 8,108,625 | B1 * | 1/2012 | Coon et al. ................... 711/150 |

\* cited by examiner

*Primary Examiner* — Eric Coleman
(74) *Attorney, Agent, or Firm* — Artegis Law Group, LLP (57) ABSTRACT

A computing device detects divergences between threads in a thread group executing on a parallel processing unit. The computing device includes an address divergence unit that identifies a subset of non-divergent threads included in the thread group. The address divergence unit stores instructions related to the subset of non-divergent threads in a multi-issue queue. The address divergence unit causes the instructions related to the subset of non-divergent threads to be retrieved from the multi-issue queue when the parallel processing unit is available. The address divergence unit causes the subset of non-divergent threads to be issued for execution on the parallel processing unit. The address divergence unit repeats the identifying, storing, and causing steps for the remaining threads in the thread group that are not included in the subset of non-divergent threads.

22 Claims, 7 Drawing Sheets

METHOD AND SYSTEM FOR RESOLVING THREAD DIVERGENCES

BACKGROUND OF THE INVENTION

Field of the Invention

The present invention generally relates to multithreaded processing and more specifically to a method and system for resolving thread divergences.

Description of the Related Art

A "thread group" is a set of parallel threads that execute the same instruction together in a single-instruction multiple-thread (SIMT) or single-instruction multiple-data (SIMD) fashion. A parallel processing unit (PPU) may issue and execute many parallel threads simultaneously in order to perform a variety of different processing tasks. When a given thread executes, that thread may read data from or write data to a particular memory location, such as a register file. Typically, the various threads within a thread group all target the same memory location. However, certain types of instructions may cause a branch to occur, causing some threads to target one memory location while causing other threads to target other memory locations. This is known in the art as "thread divergence." With conventional PPUs, thread divergence may result in system-wide PPU failure.

Accordingly, what is needed in the art is a technique for resolving divergences between threads within a thread group.

SUMMARY OF THE INVENTION

Embodiments of the present invention set forth an approach for resolving thread divergences in a parallel processing system. In one embodiment, an address divergence unit detects divergence between threads in a thread group and then separates those threads into a subset of non-divergent threads and a subset of divergent threads. In one embodiment, the address divergence unit causes instructions associated with the subset of non-divergent threads to be issued for execution on a parallel processing unit, while causing the instructions associated with the subset of divergent threads to be re-fetched and re-issued for execution.

Advantageously, in at least one embodiment, the address divergence unit within the warp scheduler and instruction unit mitigates the effects of thread divergences, thereby avoiding system-wide failure of the parallel processing unit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

In sum, an address divergence unit within a parallel processing unit separates threads in a thread group into a subset of non-divergent threads and a subset of divergent threads. The address divergence unit causes the subset of non-divergent threads to be issued for execution on the parallel processing unit, while causing instructions associated with the subset of divergent threads to be re-fetched and re-issued.

System Overview

Figure 1:
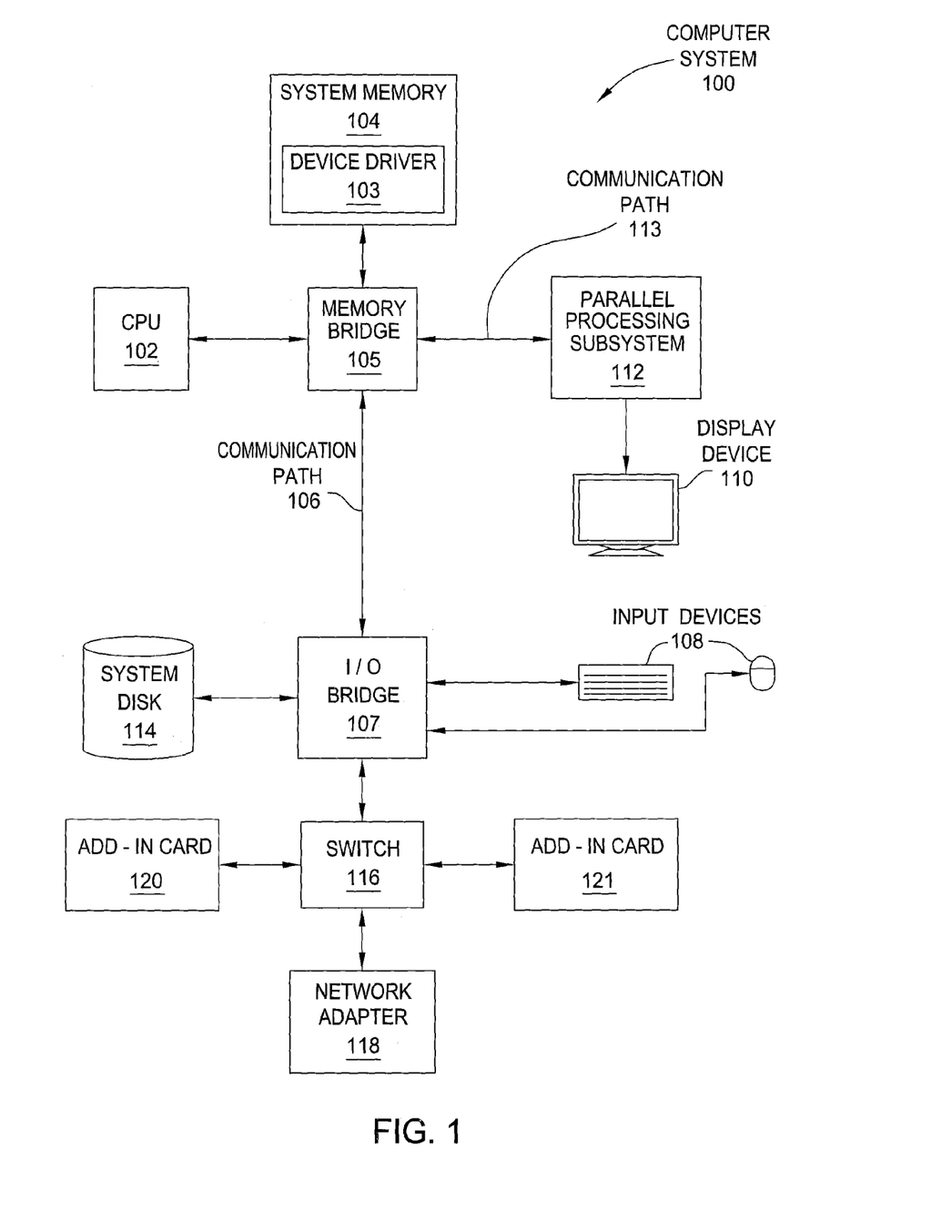
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
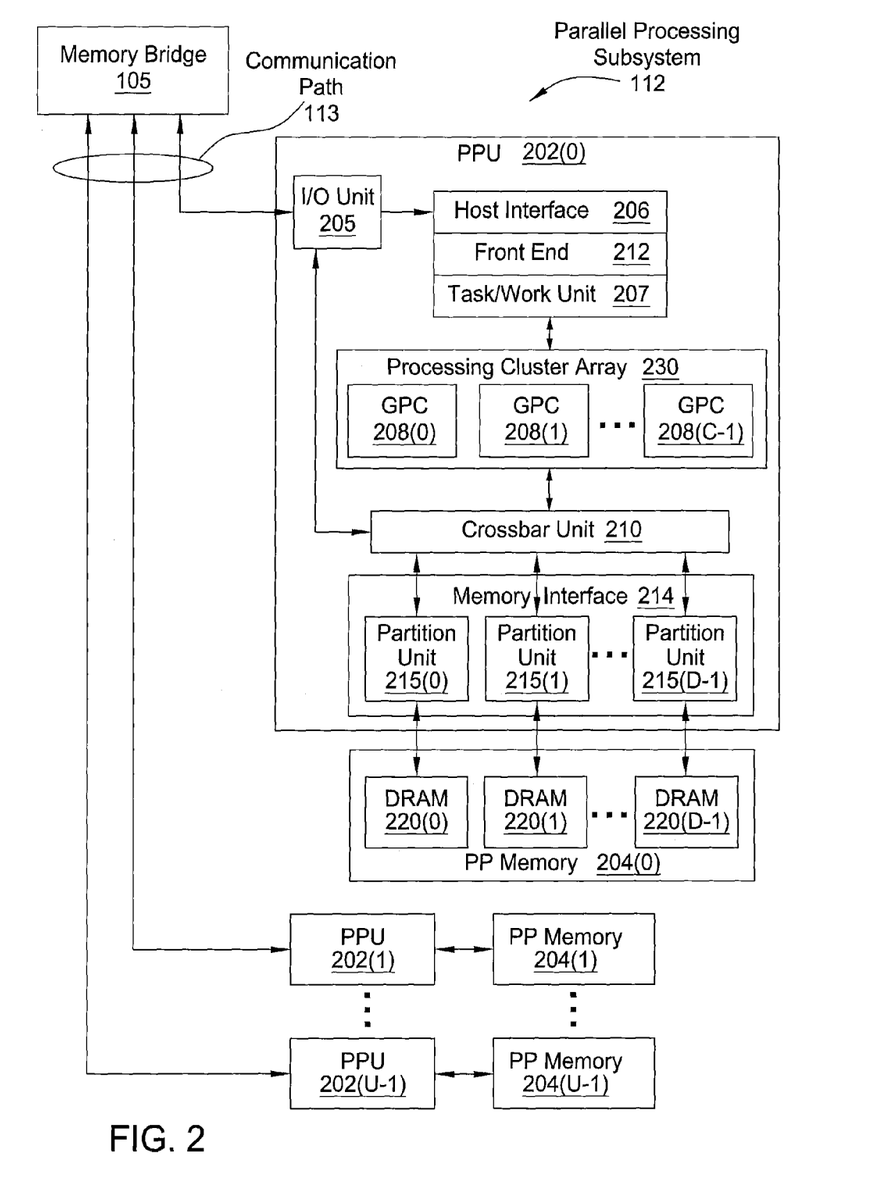
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D 1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
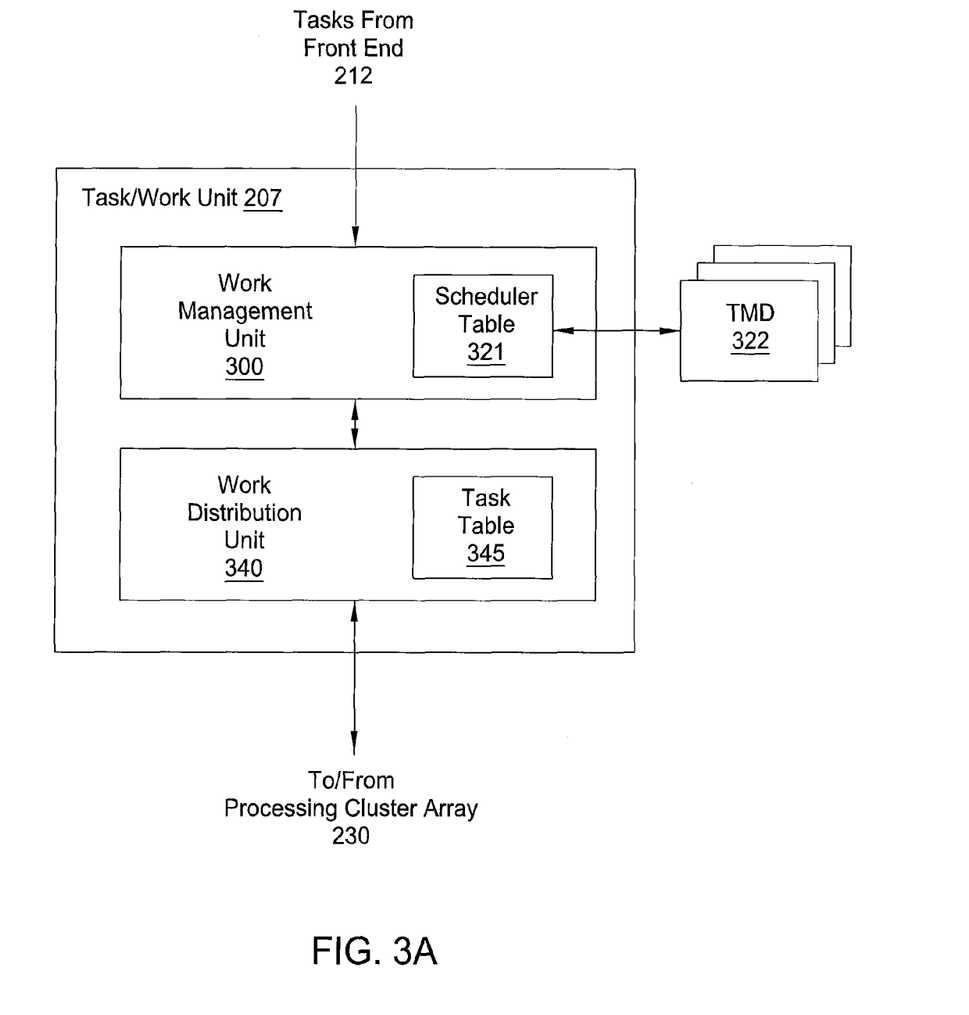
FIG. 3A is a block diagram of the front end of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled, based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
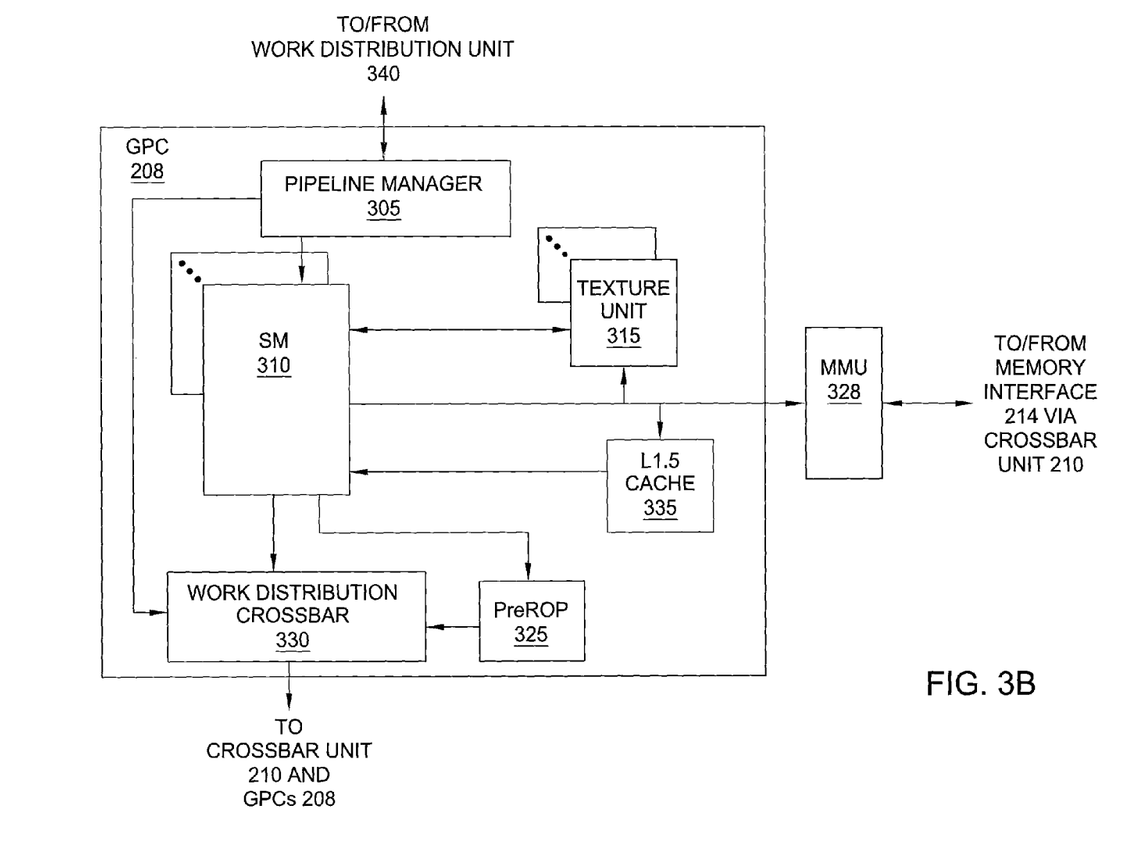
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
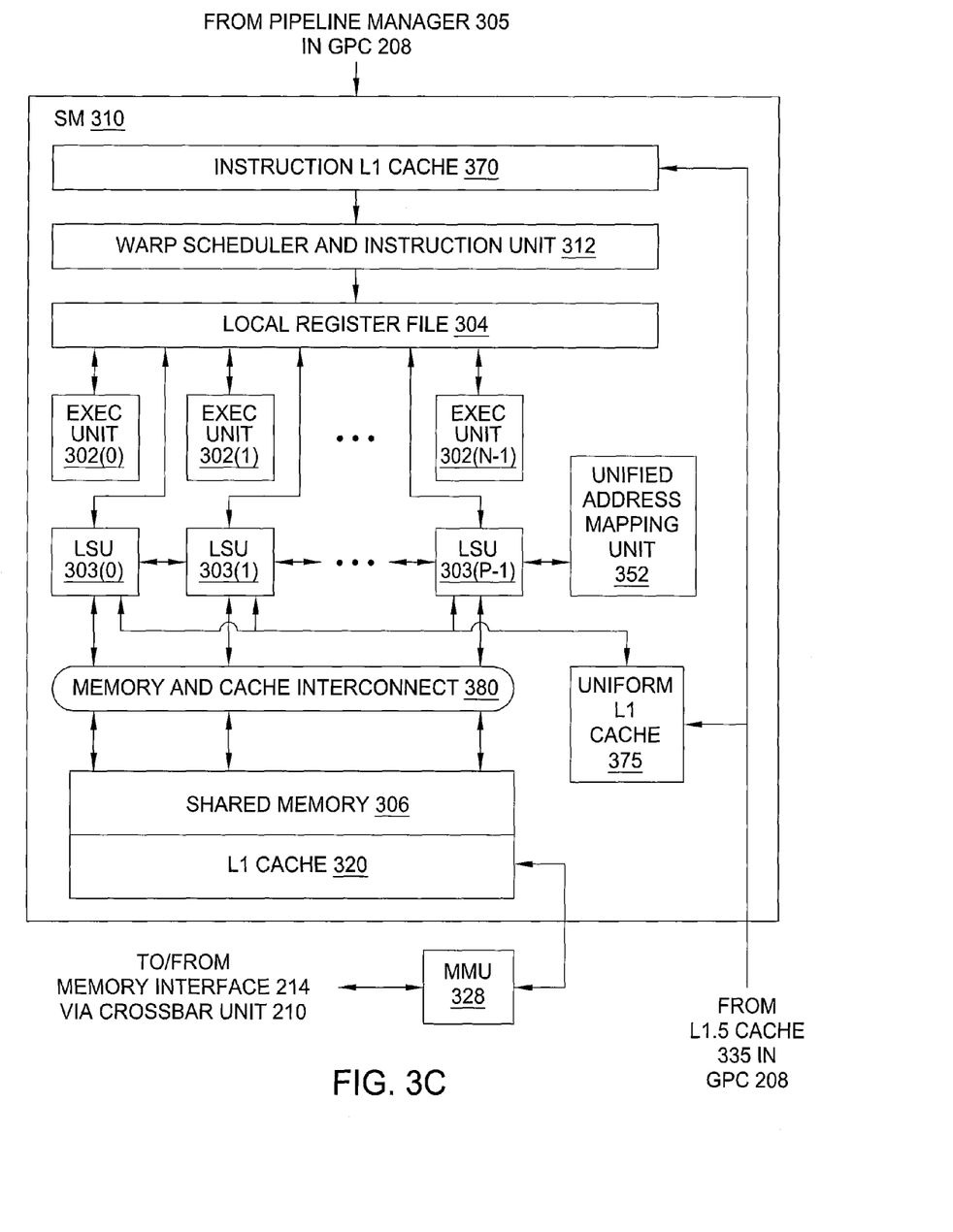
FIG. 3C is a block diagram of a portion of the streaming multiprocessor of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

As described in greater detail below in conjunction with FIGS. 4-5, warp scheduler and instruction unit 312 is configured to issue threads in a thread group to be executed on the functional units included in SM 310. As also described below, warp scheduler and instruction unit 312 is configured to detect and to resolve divergences that may occur between the threads in the thread group.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Resolving Thread Divergences

Figure 4:
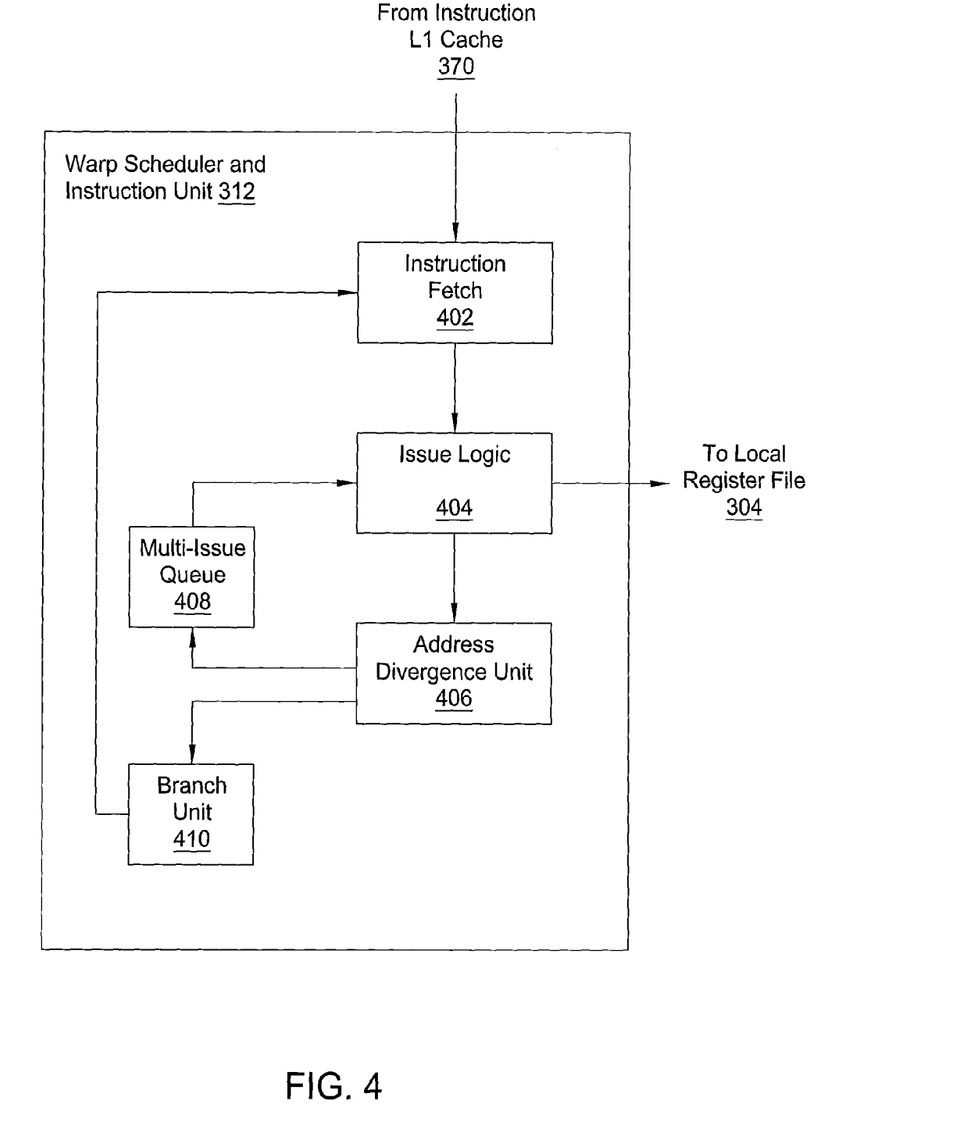
FIG. 4 is a block diagram that illustrates the warp scheduler and instruction unit of FIG. 3C in greater detail, according to one embodiment of the invention.

FIG. 4 is a block diagram that illustrates the warp scheduler and instruction unit 312 of FIG. 3C in greater detail, according to one embodiment of the invention. As mentioned above, warp scheduler and instruction unit 312 is configured to process threads within a given thread group by issuing and executing those threads using the functional units within SM 310, including exec units 302 and LSUs 303. As shown, warp scheduler and instruction unit 312 includes instruction fetch 402, issue logic 404, address divergence unit 406, multi-issue queue 408, and branch unit 410. Instruction fetch 402 is coupled to issue logic 404. Issue logic 404 is coupled to both local register file 304 (not shown here) and to address divergence unit 406. Address divergence unit 406 is coupled to both multi-issue queue 408 and to branch unit 410. Multi-issue queue 408 has a feedback connection to issue logic 404, while branch unit 410 has a feedback connection to instruction fetch 402.

Instruction fetch 402 is a hardware unit configured to fetch instructions from instruction L1 cache 370 shown in FIG. 3C while processing threads in a given thread group. The instructions fetched from instruction L1 cache 370, corresponding to the threads within the thread group, may be executed by the functional units within SM 310 in a SIMD or SIMT fashion. Those instructions may be any type of instruction, including single-issue instruction types as well as multi-issue instruction types. Instruction fetch 402 buffers incoming instructions and feeds those instructions to issue logic 404.

Issue logic 404 is a hardware unit that is configured to determine whether the instructions received from instruction fetch 402 are single-issue instructions or multi-issue instructions. When issue logic 404 determines that the received instructions are single-issue instructions, issue logic 404 issues the threads associated with those instructions to local register file 304. The functional units within SM 310 may then read local register file 304 and execute those threads.

When issue logic 404 identifies the received instructions as being multi-issue instructions, issue logic 404 directs the multi-issue instructions to address divergence unit 406. Address divergence unit 406 is a hardware unit that is configured to detect divergences between threads associated with the received instructions. In doing so, address divergence unit 406 performs a "discovery" process that reveals whether threads within a thread group are divergent or non-divergent, as described in greater detail below.

In one embodiment, when performing the discovery process, address divergence unit 406 (i) causes each thread within the thread group to be issued to local register file 304, and then (ii) analyzes local register file 304 to determine whether all of those threads target one memory location, or more than one memory location. When the threads within the thread group target only one memory location, address divergence unit 406 determines that those threads are not divergent. When the threads target more than one memory location, address divergence unit 406 determines that those threads are divergent. Persons skilled in the art will recognize that the memory location could reside within any memory resource, and could be, e.g., an entry in the register file itself.

In another embodiment, when performing the discovery process, address divergence unit 406 (i) causes each thread within the thread group to be issued to local register file 304, and then (ii) analyzes local register file 304 to determine a number of barriers associated with each thread. When all of the threads have the same number of barriers, then those threads may not be divergent. However, when some of the threads have a different number of barriers compared to other threads, then those threads are divergent.

If address divergence unit 406 determines that the threads within the thread group are not divergent, then address divergence unit 406 queues the instructions associated with the threads in multi-issue queue 408. Multi-issue queue 408 is a hardware unit that includes a set of slots, where each slot may be occupied by an instruction corresponding to a thread within the thread group. In one embodiment, a lower-priority instruction stored in a slot within multi-issue queue 408 can be evicted from that slot by an incoming higher-priority instruction. When the necessary functional units are available, issue logic 404 reissues threads associated with the instructions queued in multi-issue queue 408 for execution.

If address divergence unit 406 determines that the threads within the thread group are divergent, then address divergence unit 406 separates those threads into at least two subsets of threads. A first subset includes non-divergent threads, while the second subset includes the remaining divergent threads. In one embodiment, address divergence unit 406 separates the threads into H subsets, where each of the H subsets includes threads that are not divergent with one another. In this embodiment, address divergence unit 406 may queue each of the H subsets in multi-issue queue 408 separately.

Address divergence unit 406 may be configured to separate the threads within the thread group into non-divergent and divergent subsets using a variety of different techniques. In one embodiment, address divergence unit 406 analyzes local register file 304 and identifies a memory location targeted by a first thread, and then collects all other threads that target the same memory location. The first thread and the collected threads constitute a subset of non-divergent threads, while the remaining threads constitute a subset of divergent threads. Persons skilled in the art will recognize that any technically feasible approach for separating threads into non-divergent and divergent subsets may be implemented.

Upon separating the threads within the thread group into subsets of non-divergent and divergent threads, address divergence unit 406 sends instructions associated with the subset of non-divergent threads to multi-issue queue 408 to be queued and then issued for execution, in similar fashion as described above. Address divergence unit 406 also sends instructions associated with the subset of divergent threads to branch unit 410.

Branch unit 410 is a hardware unit that is configured to cause instruction fetch 402 to re-fetch and re-issue instructions associated with the subset of divergent threads identified by address divergence unit 406. In one embodiment, branch unit 410 includes a thread mask that records, for each thread, whether that thread belongs to the non-divergent subset or the divergent subset of threads. Branch unit 410 is configured to update the thread mask in response to receiving a subset of divergent threads. In one embodiment, address divergence unit 406 generates the thread mask during the discovery process, and then stores the thread mask in branch unit 410.

When branch unit 410 causes instruction fetch 402 to re-fetch and re-issue the instructions associated with the subset of divergent threads, address divergence unit 406 subsequently repeats the discovery process, described above, with the received subset of divergent threads. In doing so, address divergence unit 406 may separate the subset of divergent threads into non-divergent and divergent sub-subsets of threads and then process those sub-subsets separately, in like fashion as described above.

By repeating the discovery process any number of times, i.e. by separating threads into non-divergent and divergent subsets of threads, warp scheduler and instruction unit 312 may filter out all subsets of non-divergent threads and then issue each such subset for execution separately. Although the techniques described herein have been discussed in conjunction with the specific hardware units included within warp scheduler and instruction unit 312, persons skilled in the art will recognize that any computing device configured to process threads using the general approaches described above falls within the scope of the present invention.

Figure 5:
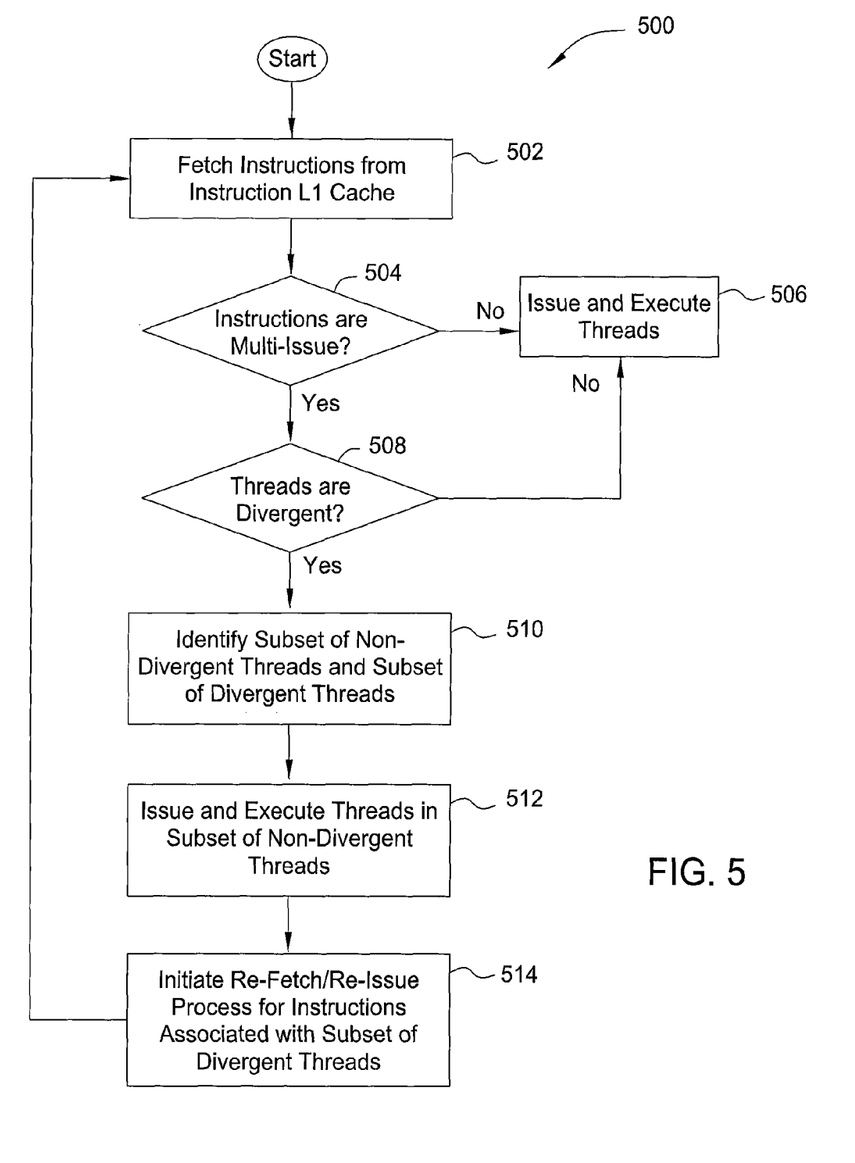
FIG. 5 is a flowchart of method steps for resolving divergences between threads within a thread group, according to one embodiment of the invention.

FIG. 5 is a flowchart of method steps for resolving divergences between threads within a thread group, according to one embodiment of the invention. Although the method steps are described in conjunction with the systems of FIGS. 1, 2, 3A, 3B, 3C, and 4, persons of ordinary skill in the art will understand that any system configured to perform the method steps, in any order, is within the scope of the inventions.

As shown, the method 500 begins at step 502, where instruction fetch 402 fetches instructions from instruction L1 cache 370 shown in FIG. 3C. The instructions fetched from instruction L1 cache 370, corresponding to threads in a thread group processed by SM 310, may be executed by the functional units within SM 310 in a SIMD or STMT fashion. Those instructions may be any type of instruction, including single-issue instruction types as well as multi-issue instruction types.

At step 504, issue logic 404 determines whether the instructions received from instruction fetch 402 are single-issue instructions or multi-issue instructions. If issue logic 404 determines that the received instructions are single-issue instructions, then the method 500 proceeds to step 506, where issue logic 404 issues the threads associated with those instructions to local register file 304. The functional units within SM 310 may then access and execute those threads. If at step 504 issue logic 404 determines that the received instructions are multi-issue instructions, then the method 500 proceeds to step 508.

At step 508, address divergence unit 406 determines whether the threads associated with the multi-issue instructions are divergent. In doing so, address divergence unit 406 performs a "discovery" process that reveals whether threads within a thread group are divergent or non-divergent. In one embodiment, when performing the discovery process, address divergence unit 406 (i) causes each thread within the thread group to be issued to local register file 304, and then (ii) analyzes local register file 304 to determine whether all of those threads target one memory location, or more than one memory location. When the threads within the thread group target only one memory location, address divergence unit 406 determines that those threads are not divergent. When the threads target more than one memory location, address divergence unit 406 determines that those threads are divergent.

In another embodiment, when performing the discovery process, address divergence unit 406 (i) causes each thread within the thread group to be issued to local register file 304, and then (ii) analyzes local register file 304 to determine a number of barriers associated with each thread. When all of the threads have the same number of barriers, then those threads may not be divergent. However, when some of the threads have a different number of barriers compared to other threads, then those threads are divergent.

If, at step 508, address divergence unit 406 determines that the threads are not divergent, and the method 500 proceeds to step 506 and those threads may be issued and executed. If at step 508 address divergence unit 406 determines that the threads are divergent, and the method 500 proceeds to step 510.

At step 510, address divergence unit 406 identifies a subset of non-divergent threads and a subset of divergent threads. In one embodiment, address divergence unit 406 analyzes local register file 304 and identifies a memory location targeted by a first thread, and then collects all other threads that target the same memory location. The first thread and the collected threads constitute a subset of non-divergent threads, while the remaining threads constitute a subset of divergent threads. Persons skilled in the art will recognize that any technically feasible approach for separating threads into non-divergent and divergent subsets may be implemented.

At step 512, address divergence unit 406 causes the threads in the subset of non-divergent threads to be issued and executed. In doing so, address divergence unit 406 queues the instructions associated with those threads in multi-issue queue 408. Multi-issue queue 408 stores the instructions until issue logic 404 is able to issue the corresponding threads to local register file 304 to be executed by the functional units within SM 310.

At step 514, address divergence unit 406 sends the instructions associated with the subset of divergent threads to branch unit 410. In response, branch unit 410 causes instruction fetch 402 to re-fetch and re-issue those instructions. The method then returns to step 502 and repeats using the subset of divergent threads as input.

In practice, warp scheduler and instruction unit 312 may perform the method 500 multiple times in multiple passes. At each pass, the method 500 may receive as input a subset of divergent threads identified during a previous pass of the method 500. In this fashion, the method 500 may be implemented repeatedly to filter out all subsets of non-divergent threads and to issue each such subset for execution separately.

Advantageously, the address divergence unit 406 within the warp scheduler and instruction unit 312 mitigates the effects of thread divergences, thereby avoiding system-wide failure of the parallel processing unit. Although thread divergences are described herein in the context of accessing local register file 304 and targeting more than one memory location or effecting differing numbers of barriers, persons skilled in the art will understand that embodiments of the invention extend to resources or aspects or portions of resources other than local register file 304 residing within computer system 100. For example, thread divergences may arise when threads are attempting to effect different barriers (as mentioned above), access different read-only variables such as constants, effect multiple attribute interpolations, access multiple rows of the same column of shared memory, access multiple rows of generalized memory, or perform memory access operations where the data-widths across the threads exceed the physical bus width associated with the memory subsystem, to name a few.

In addition, one embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for resolving divergences between threads in a thread group executing on a parallel processing unit, the method comprising:
   identifying a subset of non-divergent threads included in the thread group;
   storing instructions related to the subset of non-divergent threads in a multi-issue queue;
   retrieving the instructions related to the subset of non-divergent threads from the multi-issue queue when the parallel processing unit is available;
   causing the subset of non-divergent threads to be issued for execution on the parallel processing unit; and
   repeating the identifying, storing, retrieving, and causing steps for the remaining threads in the thread group that are not included in the subset of non-divergent threads.

2. The computer-implemented method of claim 1, wherein identifying the subset of non-divergent threads comprises:
   issuing the threads included in the thread group to a register file coupled to one or more functional units configured to execute threads;
   analyzing the register file to determine that the threads included in the thread group are configured to access more than one memory location;
   identifying a first memory location that two or more of the threads included in the thread group are configured to access; and
   organizing the two or more threads into the subset of non-divergent threads.

3. The computer-implemented method of claim 2, wherein the first memory location comprises an entry in the register file.

4. The computer-implemented method of claim 1, wherein the remaining threads in the thread group comprises a subset of divergent threads, and further comprising:
   identifying a second subset of non-divergent threads included in the subset of divergent threads;
   causing the second subset of non-divergent threads to be issued for execution on the parallel processing unit; and
   repeating the identifying, storing, retrieving, and causing steps for the remaining threads in subset of divergent threads that are not included in the second subset of non-divergent threads.

5. The computer-implemented method of claim 4, for each thread in the thread group, further comprising updating a thread mask associated with the thread group to reflect whether the thread belongs to the subset of non-divergent threads, to the second subset of non-divergent threads, or to the subset of divergent threads.

6. The computer-implemented method of claim 1, further comprising repeating the identifying, storing, retrieving, and causing steps for all threads in the thread group not identified as belonging to a subset of non-divergent threads until H subsets of non-divergent threads are identified, H being an integer greater than one.

7. The computer-implemented method of claim 6, further comprising causing each of the H subsets of non-divergent threads to be issued for execution on the parallel processing unit separately.

8. The computer-implemented method of claim 1, wherein the subset of non-divergent threads comprises one or more threads accessing a common resource or a common aspect or portion of a resource within a computing device.

9. A non-transitory computer-readable medium storing program instructions that, when executed by a processing unit, cause the processing unit to resolve divergences between threads in a thread group executing on a parallel processing unit, by performing the steps of:
identifying a subset of non-divergent threads included in the thread group;
storing instructions related to the subset of non-divergent threads in a multi-issue queue;
retrieving the instructions related to the subset of non-divergent threads from the multi-issue queue when the parallel processing unit is available; and
causing the subset of non-divergent threads to be issued for execution on the parallel processing unit.

10. The non-transitory computer-readable medium of claim 9, wherein identifying the subset of non-divergent threads comprises:
issuing the threads included in the thread group to a register file coupled to one or more functional units configured to execute threads;
analyzing the register file to determine that the threads included in the thread group are configured to access more than one memory location;
identifying a first memory location that two or more of the threads included in the thread group are configured to access; and
organizing the two or more threads into the subset of non-divergent threads.

11. The non-transitory computer-readable medium of claim 10, wherein the first memory location comprises an entry in the register file.

12. The non-transitory computer-readable medium of claim 9, wherein the remaining threads in the thread group comprises a subset of divergent threads, and further comprising:
identifying a second subset of non-divergent threads included in the subset of divergent threads; and
causing the second subset of non-divergent threads to be issued for execution on the parallel processing unit.

13. The non-transitory computer-readable medium of claim 12, for each thread in the thread group, further comprising updating a thread mask associated with the thread group to reflect whether the thread belongs to the subset of non-divergent threads, to the second subset of non-divergent threads, or to the subset of divergent threads.

14. The non-transitory computer-readable medium of claim 9, further comprising repeating the identifying, storing, retrieving, and causing steps until H subsets of non-divergent threads are identified, H being an integer greater than one.

15. The non-transitory computer-readable medium of claim 14, further comprising the step of causing each of the H subsets of non-divergent threads to be issued for execution on the parallel processing unit separately.

16. The non-transitory computer-readable medium of claim 9, wherein the subset of non-divergent threads comprises one or more threads accessing a common resource or a common aspect or portion of a resource within a computing device.

17. A computing device configured to resolve divergences between threads in a thread group executing on a parallel processing unit, comprising:
a scheduler and instruction unit that includes:
an address divergence unit configured to:
identify a subset of non-divergent threads included in the thread group,
store instructions related to the subset of non-divergent threads in a multi-issue queue,
cause the instructions related to the subset of non-divergent threads to be retrieved from the multi-issue queue when the parallel processing unit is available,
cause the subset of non-divergent threads to be issued for execution on the parallel processing unit, and
repeat the identifying, storing, and causing steps for the remaining threads in the thread group that are not included in the subset of non-divergent threads.

18. The computing device of claim 17, wherein the remaining threads in the thread group comprises a subset of divergent threads, and
the address divergence unit is further configured to:
identify a second subset of non-divergent threads included in the subset of divergent threads,
cause the second subset of non-divergent threads to be issued for execution on the parallel processing unit, and
transmit instructions related to all other threads included in the subset of divergent threads to the branch unit; and
further comprising a branch unit configured to cause the identifying, storing, retrieving, and causing steps to be repeated for the remaining threads in subset of divergent threads that are not included in the second subset of non-divergent threads.

19. The computer-implemented method of claim 1, wherein identifying the subset of non-divergent threads included in the thread group comprises determining how many barrier commands are associated with each thread in the thread group, and identifying two or more threads that are associated with the same number of barrier commands.

20. The non-transitory computer-readable medium of claim 9, wherein identifying the subset of non-divergent threads included in the thread group comprises determining how many barrier commands are associated with each thread in the thread group, and identifying two or more threads that are associated with the same number of barrier commands.

21. The computer-implemented method of claim 1, wherein each thread in the subset of non-divergent threads comprises the same number of barrier commands as every other thread in the subset of non-divergent threads.

22. The computer-implemented method of claim 21, wherein each of the remaining threads in the thread group that are not included in the subset of non-divergent threads comprises a different number of barrier commands than each thread in the subset of non-divergent threads.

* * * * *